United States Patent [19]

Rogers et al.

[11] Patent Number: 5,163,000
[45] Date of Patent: Nov. 10, 1992

[54] VEHICLE WAITING TIME INDICATOR

[76] Inventors: John N. Rogers, 2511 N. Superchicken Dr., Apt. 255; Bruce R. Kohn, 5051 Sabino Canyon #2120, both of Tucson, Ariz. 85715; Rodney T. Boorse, 4500 N. Placito Oquitoa, Tucson, Ariz. 85749

[21] Appl. No.: 600,336

[22] Filed: Oct. 19, 1990

[51] Int. Cl.⁵ .................. G06F 15/20; G06F 15/21; G06F 15/48
[52] U.S. Cl. .................. 364/424.01; 364/401; 340/933
[58] Field of Search .................. 364/401, 424.01, 407; 340/933

[56] References Cited
U.S. PATENT DOCUMENTS

| | | | |
|---|---|---|---|
| 4,392,119 | 7/1983 | Price et al. | 364/401 X |
| 4,670,844 | 6/1987 | Lach et al. | 340/933 X |
| 4,700,295 | 10/1987 | Katsof et al. | 364/401 |
| 4,797,818 | 1/1989 | Cotter | 364/401 |

*Primary Examiner*—Parshutam S. Lall
*Assistant Examiner*—Collin W. Park
*Attorney, Agent, or Firm*—Cahill, Sutton & Thomas

[57] ABSTRACT

A plurality of vehicle service stations are located in a geographical area, each station includes one or more service bays in which the vehicle is serviced, each bay has an associated lane in which one or more vehicles wait their turn to be serviced in the bay, each lane has one or more sensors for sensing the presence of vehicles in the lane. Each station has a computer which is responsive to the lane sensors for computing the waiting time at the station for a vehicle, the waiting time for each station is displayed on a visual display at the station, the waiting time from each station is also communicated to a host computer centrally located with the geographical region. The host computer has an associated phone messaging system which is responsive to phone calls made from phones in the geographical area, the host computer calculates a recommended station to proceed to and provides a digitized voice of this recommendation through the phone messaging system to a potential customer calling the messaging system over the phone.

9 Claims, 3 Drawing Sheets

VEHICLE WAITING TIME INDICATOR

DESCRIPTION

1. Technical Field

This invention relates to messaging systems, and more particularly to such systems for automatically messaging vehicle wait times.

2. Background Art

In the art of vehicle testing, it is known for the operator of the service station or test station (e.g., emissions test station) to manually measure the number of vehicles waiting in the queue (i.e., lanes) at the station and estimate the waiting time for a vehicle until service or test. Also, the operator may, if desired, manually update a visual display of the waiting time to the vehicle drivers in the queue or to those driving past the station.

It is also known to have potential customers call the station on the telephone and speak with station personnel in order to ascertain the current waiting time at the station. However, these methods tend to be inaccurate and an inefficient use of an operator's time.

DISCLOSURE OF INVENTION

Objects of the present invention include the provision of an automatic vehicle messaging system for vehicle wait times which measures the number of vehicles in a queue at a vehicle service or test station, visually displays the waiting time to vehicle drivers in the queue or driving in the vicinity of the station, and provides an automatic telephone messaging system for potential customers so that they can select the most convenient station at which to be served based in part on a combination of driving time to the station and wait time at the station.

According to the present invention, each station in a plurality of vehicle test or service stations located in a geographical area includes one or more vehicle service bays, each bay has an associated lane in which one or more vehicles wait their turn to be serviced in the bay, each lane has one or more sensors for sensing the presence of vehicles in the lane, each station has a computer which is responsive to the lane sensors for computing the waiting time before service for a vehicle at the station, the waiting time for each station is displayed on a visual display at the station, the waiting time for each station is also communicated to a host computer centrally located within the geographical region, the host computer has an associated phone messaging system which is responsive to phone calls made from phones in the geographical area, the host computer calculates a recommended station for a potential customer to proceed to based in part on the waiting times at each station and provides a digitized audio voice of this recommendation through the phone messaging system to the potential customer phoning the messaging system.

The automatic vehicle messaging system of the present invention has utility in a network of multiple vehicle service or test stations in which each station has multiple queues for vehicles awaiting a service or test procedure in providing for an efficient method of allowing a potential customer to determine the wait time before service or test of a vehicle.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
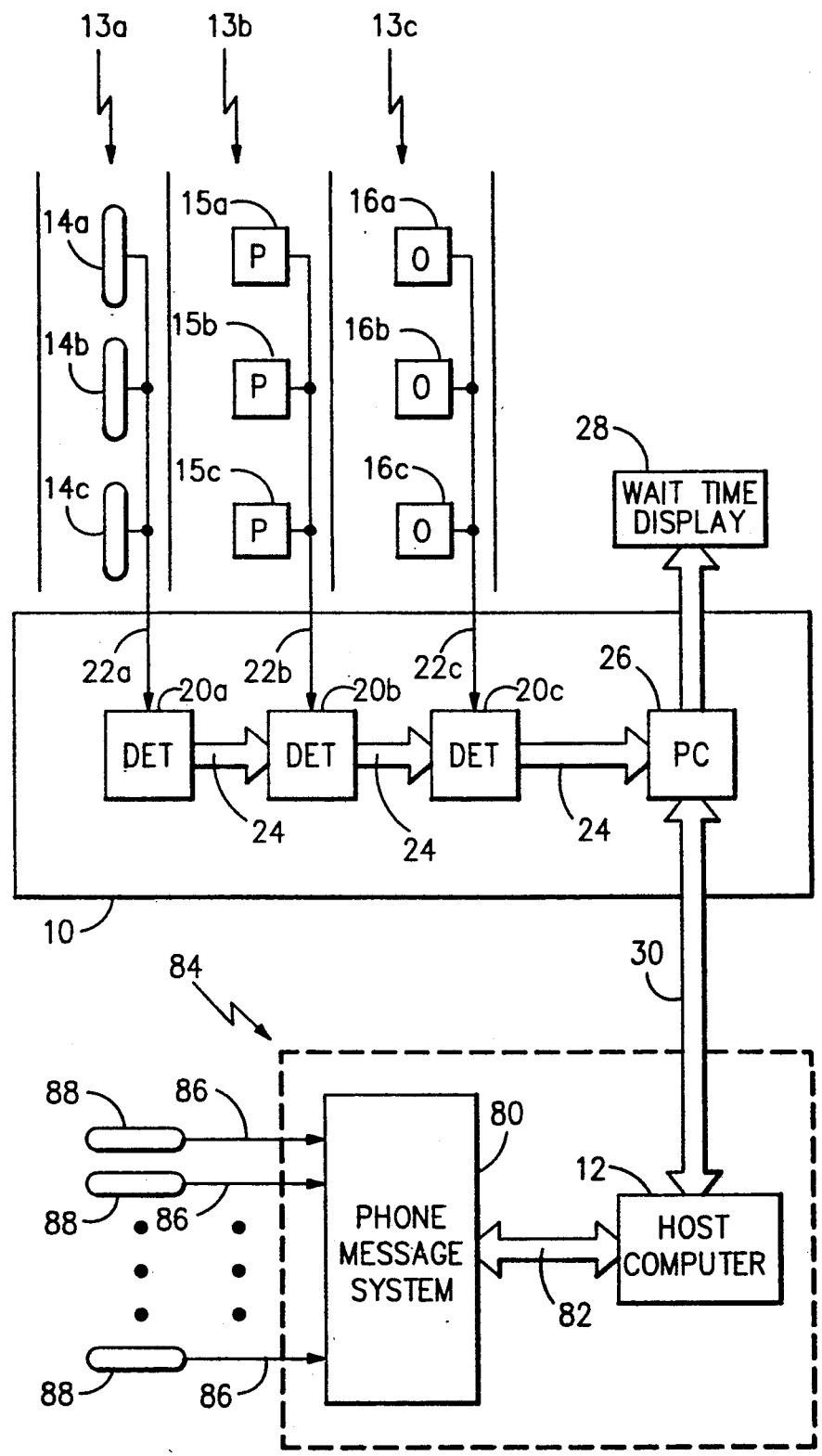
FIG. 1 is a block diagram illustration of a station connected to a centrally located host computer and phone messaging system in accordance with the present invention.

In FIG. 1 is illustrated a representative block diagram of one station 10 in a plurality of vehicle service or test stations dispersed throughout a geographical area (e.g., city, county, or state) and linked to a centrally located host computer 12. A station 10 has one or more lanes 13a-13c into which the driver maneuvers the vehicle, typically a car or light truck. Each lane 13a-13c has enough room to accommodate multiple vehicles, which await their turn to enter a corresponding bay (not shown) within the station and receive the desired service or testing procedure.

The presence of cars in a lane is sensed by one or more sensors. In accordance with a preferred embodiment of the present invention, the sensors comprise wire loops 14a-14c embedded under the surface of the lane 13a and electrically connected to a detector 20a by corresponding signal lines 22a. An exemplary loop may be one of the models 3670, 3672, or 3630 preformed inductive wire loop, provided by Indicator Controls Corporation of Rancho Dominguez, Calif. A corresponding exemplary detector 20a may be one of the series 3DLD, models R23B, R23T, S24B, S24T, R4MB, R4MT, S4MB, R49B, or R49T, also provided by Indicator Controls Corporation.

However, the sensors may comprise, if desired, other types of known, readily-available devices. Examples include one or more pneumatic sensors 15a-15c, such as tubes laid across the surface of the lane 13b, which sense tire pressure across the sensor 15a-15c and communicate this information to an appropriate detector 20b over corresponding signal lines 22b. Alternatively, the sensors may comprise well known optical beam devices 16a-16c, which detect when a vehicle wheel breaks an optical beam directed across the lane 13c. The optical devices 16a-16c communicate this information over signal lines 22c to an appropriate detector 20c.

FIG. 1 illustrates a combination of all three of the aforementioned types of sensors in corresponding lanes 13a-13c; however, it is to be understood that a single type of the aforementioned sensors may be employed, if desired, in every lane 13a-13c. The type of detector 20a-20c chosen depends on the corresponding type of sensor employed.

Two methods are used for measuring the number of vehicles in the lanes. A first method is a static approach where multiple sensors 14a-14c, 15a-15c, 16a-16c in each lane 13a-13c provide direct information of the number of waiting vehicles in the corresponding lane. This method is illustrated in FIG. 1. A second method is a dynamic approach in which only a single sensor 14a,15a,16a is placed at the entrance to each lane. Using this method the number of completed tests or services is subtracted from the number of cars that have crossed the lane entrance. In both methods the time for test or service is monitored at the station 10 and the wait time calculated by a station personal computer (PC) 26 using the queuing algorithm of FIG. 2.

The detector 20a–20c outputs signals over a known serial communications interface bus 24 (e.g., RS232) to, e.g., a model AT Personal Computer 26 provided by IBM Corporation. If more than one of the aforementioned types of sensor is employed, then each of the corresponding detectors 20a–20c is individually connected to the PC 26 over an appropriate serial communications interface bus 24.

The PC is located within the station and, in accordance with the present invention, the PC calculates an average wait time for a vehicle entering a lane at the station, updates the station waiting time in a database in PC memory, and transmits the waiting time to a station visual display 28 and also through a telephone network 30 to the host computer 12. The PC transmits the wait time to the host computer by known modem equipment over the network 30, which itself may comprise one or more dedicated phone lines.

Figure 2:
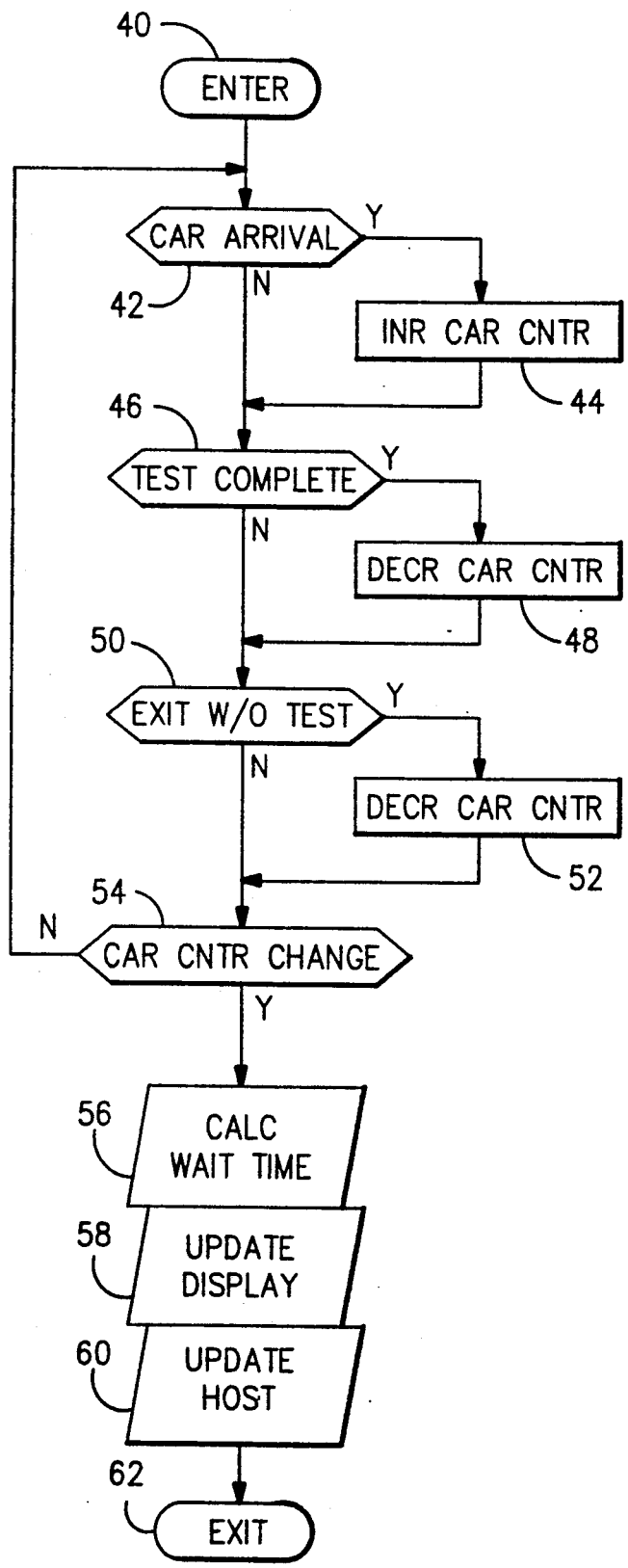
FIG. 2 is a flowchart diagram of software steps executed by a computer located at the station of FIG. 1.

In FIG. 2 is illustrated a flowchart diagram of software steps performed by the PC in calculating the station wait time. Beginning after an enter step 40, the PC checks in a test 42 for the arrival of any additional vehicles into any of the lanes 13 since the previous execution of the flowchart of FIG. 2. This additional vehicle information is communicated to the PC 26 from the detector 20a–20c. If any additional vehicles are present, a car counter is incremented in a step 44.

The PC then checks in a test 46 for a condition where a vehicle has completed its service/test procedure, has left the station, and the next vehicle in line has taken its place in the station. Typically, when a vehicle enters a bay and begins the testing procedure, the service station operator manually enters vehicle information into the PC such as the license plate number or vehicle identification number (VIN). The test procedure then begins. The PC maintains in its database the expected times for completion of the various tests performed. Now, by assuming that the test procedure begins with the entry of this VIN information, the ultimate determination of when a test is complete can be made.

If a test has been completed, the car counter is decremented in a step 48. Next, the PC checks, in a test 50, if a car most previously in the station has left without being tested. This determination may be made, e.g., by having a bypass route in the station such that a vehicle does not actually enter the bay for testing or servicing, but instead enters another area of the station for some other type of non-standard procedure. For example, in emissions testing, the non-standard procedure may involve a waiver or exemption of the emissions test due to the fact that the vehicle is of the diesel engine type. This area of the station where the non-standard procedure is performed may have a sensor 14a,15a,16a of a type similar to that hereinbefore described to detect the presence or absence of a vehicle in this bypass area and signal this fact to the PC through the detector 20a–20c. If the car has left without being tested, the car counter is decremented in a step 52.

The PC then checks, in a test 54, for any changes in the value of the car counter in the current execution of the flowchart of FIG. 2. If there is no change in the car counter, PC program execution branches back to the test 42 for car arrival. If there is a change in the car counter, the PC calculates, in a routine 56, a new value for the station wait time. The wait time is a function of the total number of available bays in the station (whether occupied or unoccupied), the number of cars waiting in the corresponding lanes along with the number of available spaces in the lanes, the number of available service personnel or test inspectors, and the typical time taken for a test along with the types of tests which are active or in progress. Some of this information may be predetermined and entered into the PC database before execution of the flowchart of FIG. 2.

For example, assume that the station 10 in FIG. 1 has three available bays, all presently occupied, and that the three lanes 13a–13c each have two waiting vehicles. Also assume that the same test (e.g., emissions) is being run in each bay, that the test takes five minutes to complete, and that the test in each bay has just begun. Thus, if a vehicle were to pull into the station at that moment and enter any of the lanes, the current wait time as computed by the station PC in accordance with the flowchart of FIG. 2 is 15 minutes (three vehicles multiplied by five minutes per test).

Next, the PC updates the station display 28, in a routine 58, with the calculated wait time. The display is a known visual display device which is preferably large enough so that the wait time is easily readable by not only the vehicles waiting to be serviced, but also by potential customers passing by the station. The PC then updates the host computer 12, in a routine 60, with the calculated wait time for that particular station. The subroutine of FIG. 2 then exits in a step 62.

Figure 3:
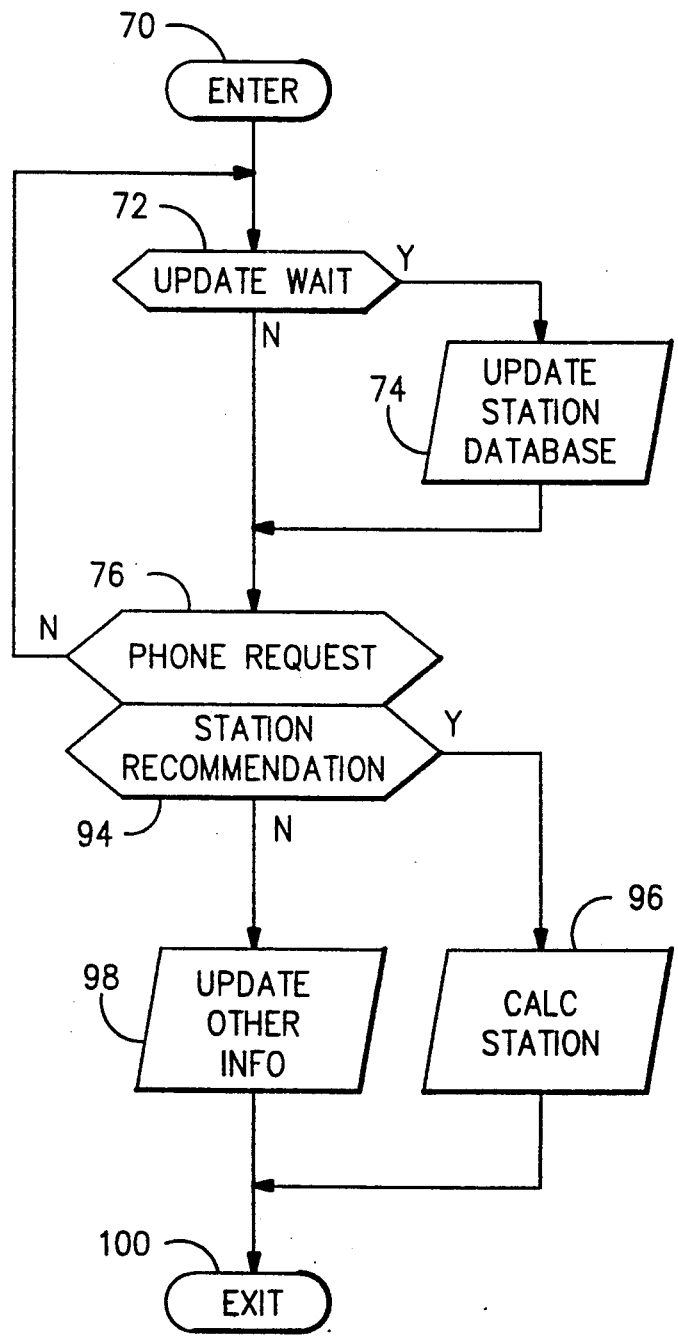
FIG. 3 is a flowchart diagram of software steps executed by the host computer of FIG. 1.

In FIG. 3 is illustrated a flowchart diagram of software steps performed by the host computer 12 in determining, inter alia, a recommended station for a potential customer to proceed to, in accordance with the present invention. The host computer may typically comprise a model MicroVax provided by Digital Equipment Corporation of Maynard, Mass., or a PC similar to the station PC 26 provided by IBM. Although only a single station is illustrated in FIG. 1, it is to be understood that the single host computer is responsive to a plurality of PCs, each PC being located in one station in a network of a plurality of stations. Each PC computes the current value for a vehicle wait time at that station, in accordance with the flowchart of FIG. 2, and transmits that information to the host over its corresponding network 30.

After an enter step 70 in FIG. 3, the host checks, in a test 72, if any station in the network of stations has recently communicated an updated station wait time, as computed by the corresponding station PC in the routine 56 (FIG. 2). If so, the host updates in a routine 74 a database in memory of the current values of station wait times.

The host then checks in a test 76 if there has been a request by telephone from a potential customer inquiring as to one of several types of information made available by the host computer from its database. In FIG. 1 is illustrated an automatic phone messaging system 80 connected to the host 12 by data bus 82. The phone messaging system 80 and the host computer comprise apparatus 84 which is centrally located within the geographical region to communicate with each individual PC at each individual test/service station 10.

In a preferred embodiment of the present invention, the phone messaging system may comprise one or more circuit boards which plug into the motherboard inside the host. In this example, the data bus 82 represents the internal bus of the host. However, it is to be understood that the host computer and phone messaging system may, if desired, comprise a complete, dedicated system.

The phone messaging system may comprise the model Watson Personal Office Automation System provided by Natural MicroSystems Corporation of Natick, Mass. The Watson system includes a single circuit board having voice processing capabilities which plugs into the host motherboard, along with associated software. The phone messaging system is responsive to phone calls made thereto over ordinary telephone lines 86, typically four to eight in number. Potential customers of the network of test/service stations may access the database of the host by telephones 88 connected to the phone lines 86. The telephones 88 are of the touch tone type most prevalent in use today and represent phones typically located in homes, businesses, or vehicles. In the preferred embodiment of the present invention, each phone line plugs into phone jacks mounted in the messaging system circuit board. As described in more detail hereinafter, a potential customer accesses the information on the host database through appropriate touch tone entries upon corresponding audio prompts by the messaging system.

Referring again to FIG. 3, if there has been no customer phone request, the flowchart branches back to the test 72 for wait time updates. If there has been a phone request, the host checks, in a test 94, if the request is for a recommended station for the customer to proceed to in order to receive the desired service or test procedure.

If there has been a request for a recommended station, the host calculates, in a routine 96, the recommended station for the customer to proceed to. A station is recommended based on a combination of factors, including the current wait time at each station in the network, the location of the customer phone call within the geographical area, the driving distance from the call location to each station, and the time of day. The host, through the messaging system, prompts the potential customer to enter the ZIP code of the area the customer currently is in. The host then calculates the shortest combination of driving and waiting time for every ZIP code area in the geographical region based on known driving times and the calculated wait times. The driving times within each ZIP code area are located within the host database. The host also updates digitized voice files on the phone messaging system with the pertinent information. Thus, customers calling the phone messaging system from touch tone phones can obtain the waiting times at any station and a recommendation of the station near them with the shortest drive/wait time combination.

If there has been a phone request, but not one for a recommended station, the host updates, in a routine 98, digitized voice files on the phone messaging system with alternative information about available test or service procedures. Exemplary information consists of cost of test/service, limits on types of vehicles that can be tested/serviced, and hours of station operation. This alternative information is stored in the host database. Customers calling the phone messaging system from touch tone phones can obtain this other information through appropriate push button phone entries. After the information has been given to the customer, the flowchart exits in a step 100.

The automatic messaging system described hereinbefore in accordance with the present invention is for use in a network of multiple service or test stations where each station has multiple queues for vehicles awaiting test or service. The system automatically measures the number of vehicles in the queue at a service or test station and computes the waiting time, automatically displays the waiting time to the vehicle drivers in the queue or driving past the station, and automatically provides a telephone messaging system for customers so that they can select the most convenient station at which to be served based on a combination of driving time to the station and wait time at the station.

The present invention has been described with regard to a vehicle test or service station configuration. However, it is to be understood that the broadest scope of the present invention contemplates a configuration of stations such as fast food restaurants, or other types of stations where vehicles normally wait in a line before receiving the desired service.

Although the invention has been illustrated and described with respect to a best mode embodiment thereof, it should be understood by those skilled in the art that the foregoing and various other changes, omissions, and additions in the form and detail thereof may be made without departing from the spirit and scope of the invention.

We claim:

1. Apparatus for providing an indication of a waiting time until service commences on a vehicle after the vehicle enters one of several lanes at a service station, the service station being one in a network of similar service stations located in a geographical region, the apparatus comprising:

sensing means for sensing the presence of said vehicle in said lane at said one station and for generating a signal indicative of the presence of said vehicle;

station signal processing means coupled to said sensing means for computing said waiting time and for generating a wait signal indicative of said waiting time;

display means, coupled to said station signal processing means, for providing a visual indication of said wait signal;

telephone messaging means for receiving phone calls from potential customers inquiring as to waiting times at stations in said network and for generating inquiry signals indicative thereof; and host signal processing means, coupled to the station signal processing means of each station in said network and to said messaging means, for providing a signal indicative of a recommended station proximate the potential customer and having a shorter waiting time than at least one of the other stations;

said telephone messaging means further comprising means responsive to said signal from said hot signal processing means for providing information to the potential customer relating to said recommended station.

2. The apparatus of claim 1 wherein said sensing means comprises sensing loops disposed in a surface of said lane to sense a vehicle passing thereover, said lane having a plurality of said loops located apart from one another.

3. The apparatus of claim 1 wherein said sensing means comprises a signal sensing loop disposed in a surface of said lane to sense a vehicle passing thereover, said sensing loop located at an entrance to the lane.

4. The apparatus of claim 1 wherein said sensing means comprises pneumatic sensors disposed in said lane to sense a vehicle passing thereover, said lane having a plurality of said pneumatic sensors located apart from one another.

5. The apparatus of claim 1 wherein said sensing means comprises a pneumatic sensor disposed in said lane to sense a vehicle passing thereover, said pneumatic sensor located at an entrance to the lane.

6. The apparatus of claim 1 wherein said sensing means comprises optical sensors disposed in said lane to sense a vehicle, said lane having a plurality of said optical sensors located apart from one another.

7. The apparatus of claim 1 wherein said sensing means comprises an optical sensor disposed in said lane to sense a vehicle, said optical sensor located at an entrance to the lane.

8. The apparatus of claim 1 wherein said information comprises audio information.

9. The apparatus of claim 8 wherein said information comprises digitized audio voice information.

* * * * *